(12) United States Patent
Kerling et al.

(10) Patent No.: US 11,651,908 B2
(45) Date of Patent: May 16, 2023

(54) METHOD OF WINDING COILWARE, COMPUTER PROGRAM PRODUCT, CONTROL DEVICE, AND WINDING MACHINE

(71) Applicant: Siemens Aktiengesellschaft, Munich (DE)

(72) Inventors: Sebastian Kerling, Erlangen (DE); Thomas Richter, Obermichelbach (DE); Björn Seelinger, Höchstadt (DE); Roland Zimmermann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 385 days.

(21) Appl. No.: 17/029,308

(22) Filed: Sep. 23, 2020

(65) Prior Publication Data
US 2021/0090821 A1 Mar. 25, 2021

(30) Foreign Application Priority Data

Sep. 24, 2019 (EP) ..................... 19199111

(51) Int. Cl.
*H01G 13/00* (2013.01)
*H01G 13/02* (2006.01)
(Continued)

(52) U.S. Cl.
CPC ............... *H01G 13/02* (2013.01); *H01G 4/32* (2013.01); *H01M 10/0587* (2013.01)

(58) Field of Classification Search
CPC ..... H01G 13/02; H01G 4/32; H01M 10/0587; Y02P 70/50; B65H 59/385; B65H 59/387;
(Continued)

(56) References Cited

U.S. PATENT DOCUMENTS

2013/0026278 A1 1/2013 Bitterolf et al.
2016/0036086 A1 2/2016 Lee et al.
(Continued)

FOREIGN PATENT DOCUMENTS

DE 391960 B * 12/1990 ............... H01G 4/22
DE 19614300 10/1996
(Continued)

OTHER PUBLICATIONS

EP Search report dated Apr. 3, 2020 based on EP 19199111 filed Sep. 24, 2019.

*Primary Examiner* — Emmanuel M Marcelo
(74) *Attorney, Agent, or Firm* — Cozen O'Connor (57) ABSTRACT

A method of winding coilware via a winding machine having a plurality of winding devices, which are drivable by a plurality of drives which comprise at least a supply roll and a winding body, includes providing the coilware from the supply roll and winding the coilware over at least one deflection roll onto the winding body, where at least one drive is adjusted as a function of a position-dependent compensation signal at least partly compensating a defect, and where the position-dependent compensation signal for the drive is provided by acquiring a time domain interference variable during a winding operation, transforming the acquired interference variable into a frequency domain spectrum, filtering the spectrum via a filter specific to the winding device assigned to the drive, transforming the filtered spectrum back into the time domain to provide a time-dependent compensation signal, and transforming the time-dependent compensation signal into the position-dependent compensation signal.

21 Claims, 4 Drawing Sheets

(51) Int. Cl.
*H01G 4/32* (2006.01)
*H01M 10/0587* (2010.01)

(58) Field of Classification Search
CPC .. B65H 54/10; B65H 23/195; B65H 23/1825; B65H 23/1955; B65H 23/198; H01F 41/094
See application file for complete search history.

(56) References Cited

U.S. PATENT DOCUMENTS

| | | |
|---|---|---|
| 2018/0162682 A1 | 6/2018 | Karl et al. |
| 2019/0352123 A1 | 11/2019 | Kerling et al. |

FOREIGN PATENT DOCUMENTS

| | | | |
|---|---|---|---|
| EP | 2305393 | 4/2011 | |
| EP | 2485227 | 8/2012 | |
| EP | 3333106 | 6/2018 | |
| EP | 3333106 A1 * | 6/2018 | ............ B65H 20/34 |
| EP | 3569537 | 11/2019 | |
| JP | H0899464 A * | 4/1996 | ............ B41M 5/26 |
| JP | H10114467 A * | 5/1998 | ............ B65H 54/28 |
| JP | 2015121608 A * | 7/2015 | ......... B65H 18/026 |
| KR | 870001479 B1 * | 8/1987 | ........ B65H 23/1888 |
| WO | 2018029129 | 2/2018 | |

* cited by examiner

METHOD OF WINDING COILWARE, COMPUTER PROGRAM PRODUCT, CONTROL DEVICE, AND WINDING MACHINE

BACKGROUND OF THE INVENTION

1. Field of the Invention

The present invention relates to a method and a computer program product for winding coilware from a supply roll onto a winding body. The present invention also relates to a control device for a winding machine and such a winding machine.

2. Description of the Related Art

When winding coilware, in particular in the case of a wire or a sheet, onto a winding body, a winding tension is regularly applied to the coilware. Here, the winding tension corresponds to the force (per cross-sectional area) with which the coilware is wound onto the winding body. In modern devices for winding coilware, the winding tension can be adjusted. In other words, the winding tension is the tensile stress of the coilware.

EP 2 485 227 A1 describes a wire-winding machine and control for such a wire-winding machine.

EP 3 333 106 A1 describes a method of winding coilware from a supply roll onto a winding body having a non-circular cross section, in which the coilware is provided from the supply roll and is wound onto the winding body, where the winding tension of the coilware is adjustable to an envisaged winding tension, and where a rotational speed of the winding body is controlled or regulated to adjust the winding tension and/or the winding tension is adjusted to the envisaged winding tension by an adjustment unit.

In such winding machines, interferences can occur as a result of inaccuracies in assembly and/or manufacture, which can have a detrimental effect on the quality of the product. In this case, it is not necessarily known which partial component of the defect is caused by which device of the winding machine.

For example, the imbalance of two different deflection rolls of the winding machine may have a detrimental influence on the web tension. The resultant defect can certainly be measured but the assignment of the partial components of the defect and the feedforward control of the corresponding partial components at the correct location has hitherto not been possible in conventional winding machines. As a result of feedforward control of the signal at a wrong location, for example, not at the device causing the partial component of the defect, the quality of the product could even be made worse.

In an earlier, unpublished application from applicants, a method of winding coilware from a supply roll onto a winding body having a non-circular cross section of a winding machine is described, in which the coilware is provided from the supply roll and the coilware provided from the supply roll is wound onto the winding body over at least one deflection roll, where a current winding tension of the coilware is adjusted to a target winding tension depending on a position-dependent compensation signal, stored in a memory unit, for the compensation of a variable free length of the coilware between the deflection roll and the winding body because of the non-circular cross section of the coilware.

The included frequency components or partial spectra of the compensation signal particularly depend on the geometry of the winding body, the geometric arrangement of the winder relative to the first deflection roll and the process speed. Depending on the mechanical system of the winding machine, in particular comprising the stiffness of the mechanism, the gears, the belts and the coupling, it is not possible for all the frequency components to be transmitted to the load side without distortion. This can lead to from low negative influences on the process quality as far as mechanical damage to the winding machine.

In view of the foregoing, it is an object of the present invention to improve the winding of coilware onto a winding body.

This and other objects and advantages are achieved in accordance with the invention by a method of winding coilware via a winding machine having a plurality of winding devices that can be driven by a number of drives, which comprise at least a supply roll and a winding body. In accordance with the invention, the method comprises the providing the coilware from the supply roll, and winding the coilware provided from the supply roll over at least one deflection roll onto the winding body, where at least one of the drives is adjusted as a function of a position-dependent compensation signal at least partly compensating a defect. The position-dependent compensation signal for the respective drive is provided by a) acquiring an interference variable representing the defect in the time domain during a winding operation, b) transforming the acquired interference variable from the time domain into a spectrum in the frequency domain, c) filtering the spectrum via a filter specific to the winding device assigned to the drive, d) transforming the filtered spectrum from the frequency domain into the time domain to provide a time-dependent compensation signal, and e) transforming the time-dependent compensation signal into the position-dependent compensation signal.

With the present invention, an optimized position-dependent compensation signal can be generated and utilized during the winding operation. In particular, for each drive of the drivable winding devices of the winding machine, a specific position-dependent compensation signal is generated and utilized during the winding operation, in particular for the feedforward control of the respective drive.

The present method can be used without knowledge of the geometry of the winding body, because the position-dependent compensation signal can be derived from the acquired interference variable as such. Thus, the present method is flexible, in particular as far as the mechanism of the winding machine is concerned, because the defect is learned through the application of steps a) to e). The winding body has, for example, a circular cross section, in particular a non-circular cross section, because the present compensation is then particularly effective.

The step a) is performed in particular during a measurement run, i.e., before normal operation of the winding machine, during which the interference variable that is critical for the process quality is recorded. The acquired or recorded interference variable is then transformed into the frequency domain via a transformation, for example a Fourier transformation such as a fast Fourier transform (FFT) and can then be analyzed. High-frequency components of this signal that cannot be transmitted by the drive train can be filtered out of the signal in the step. The filtered signal is converted into the time domain again with an inverse transformation, such as an inverse FFT. The compensation signal obtained here can then undergo feedforward control after a transformation from the time domain into the spatial domain, in order to compensate for the disruptive process influences of the winding operation. Furthermore, the present method has the advantage that other mechanical influences, such as for example imbalances of the deflection roll or other winding devices during the assembly, are likewise taken into account automatically.

With the present method, the process speed can advantageously be increased with an existing mechanism of the winding machine. Furthermore, the process quality can also be increased by the present method with the existing mechanism of the winding machine.

Defects during the winding operation can be caused, for example, by imbalances in the assembly of one or more of the winding devices or by a variable free length of the coilware between the deflection roll and the winding body, in particular when a winding body having a non-circular cross section is used. The compensation signal or the compensation signals can advantageously compensate for these defects.

The interference variable is in particular a difference, between a current value and a target value, acquired over a multiplicity of windings or at least part of a winding cycle. Such a difference can be at least partly caused, for example in the case of a winding body having a non-circular cross section, by a variable free length of the coilware between the deflection roll and the winding body because of the non-circular cross section of the coilware. Examples of such current values and target values comprise a current winding tension of the coilware and a target winding tension of the coilware and also a current torque and a target torque. A further example of an interference variable is a dancer position deviation of a target position of the dancer roll from a current position of the dancer roll during the winding operation.

The position-dependent compensation signal is particularly calculated in advance for an overall winding operation or for a partial winding operation and stored in a memory unit. In particular, the calculated compensation signal is stored in a table or polynomial table, also called a cam disk.

In particular, the path length of the coilware between the deflection roll and the winding body is designated as the free length of the coilware. If multiple deflection rolls are provided in the winding machine, then the deflection roll connected immediately upstream of the winding body is meant. For example, the free length of the coilware is the path length between the contact point of the coilware on the deflection roll and the contact point of the coilware on the winding body.

The winding tension is understood to be the tension, in particular the mechanical tension, of the coilware during winding. In particular, the winding tension is defined as the force that acts on the coilware perpendicularly to the cross-sectional area thereof, divided by the cross-sectional area.

The target winding tension is understood to be the winding tension with which the coilware is to be wound onto the winding body. The target winding tension can also be designated as the envisaged winding tension. The target winding tension can be represented as a function of the alignment of the winding body. By way of example, this is relevant when winding wire coilware around an angular winding body, in order to achieve an optimized result.

The winding tension is preferably proportional to the curvature of the winding body at the contact point of the winding body. Such a proportionality is particularly advantageous when winding metal wires. A non-circular cross section is understood to be a cross section that deviates from a circular shape. This means that the coilware has a non-constant diameter, i.e., at least two different diameters. By way of example, such a winding body having a non-circular cross section is elliptical or rectangular.

For example, battery cells or foil capacitors are produced by the present method. A supply roll is in particular understood to mean a device for keeping the coilware in the winding machine. By way of example, the supply roll is a wire roll or a roll-on which foil is rolled up. The winding body can be assigned a first rotational speed, whereas the supply roll can be assigned a second rotational speed, such that the supply roll provides the coilware at a speed that is proportional to the second rotational speed. The deflection roll preferably means that deflection roll from which the coilware is led to the winding body.

The winding tension can also be designated as web tension or coilware tension. During a winding operation onto a winding body having a non-circular cross section, the portion between the contact point of the coilware on the winding body and the contact point of the coilware on the deflection roll connected upstream varies during the rotation of the winding body. This change, as in the present case, is designated as the variable free length of the coilware between the deflection roll and the winding body. The change in this distance between the contact points results in a change in the current winding tension, also on the basis of which the current winding tension is adjusted to the target winding tension by the present inventive method. In the present case, in particular adjustment means control or regulation.

Preferably, the current winding tension is constant, in particular during a winding cycle of N revolutions of the winding body. The current winding tension is preferably to be kept constant during battery cell manufacture and the winding of capacitors. Here, "constant" is to be understood in particular to mean that the winding tension remains constant during the winding operation, in particular at the contact point of the coilware on the (in particular already wound) winding body.

In accordance with one embodiment, the filter assigned to the drive is configured as a function of parameters of the winding device assigned to the drive. For example, the supply roll has a specific rotational frequency (operating frequency) during operation. Consequently, if defects occur during the winding operation, then the supply roll has components in the acquired interference variable at this specific rotational frequency or one or more of its harmonics. Based on these parameters, the filter assigned to the drive of the supply roll is then configured. The filter configured in this way can then filter out the components in the interference variable caused by the supply roll in the frequency domain, such that the compensation signal to be generated for the drive of the supply roll can be provided appropriately. Filtering or filtering out can also be designated as extraction.

In accordance with a further embodiment, during the filtering of the spectrum in step c), frequencies of the spectrum above a specific limiting frequency can be masked out or suppressed. Such frequencies above the specific limiting frequency are advantageously suppressed, because they cannot be transmitted by the mechanism of the winding machine and therefore do not have to be taken into account during the generation of the compensation signal or the compensation signals. This advantageously reduces the damage potential.

In accordance with a further embodiment, during the filtering of the spectrum in step c), those partial spectra of the spectrum that depend on an operating frequency of the winding device assigned to the drive are filtered out. Then, in step d), the partial spectra that are filtered out are transformed from the frequency domain into the time domain in order to provide the time-dependent compensation signal for the drive. Therefore, specific compensation signals can be generated for the respective drive. The respective partial spectrum relates to the respective winding device influencing the respective defect, and the corresponding compensation signal is generated for the drive of this winding device.

In accordance with a further embodiment, during the filtering of the spectrum in step c), those partial spectra of the spectrum which correspond to an operating frequency of the winding device assigned to the drive or one of its harmonics are filtered out. Then, in step d), the partial spectra that are filtered out are transformed from the frequency domain into the time domain to provide the time-dependent compensation signal for the drive.

In accordance with yet a further embodiment, following step b), the spectrum is analyzed to assign at least one partial spectrum to a winding device at least partly causing the defect. The winding machine comprises a multiplicity of winding devices, such as the supply roll, the winding body and, for example, the dancer roll. The respective winding device will in particular cause only part of the defect and therefore contribute only partially to the interference variable. Accordingly, the spectrum of the interference variable is analyzed, and the respective partial spectrum is assigned to the respectively causative winding device.

The respective partial spectrum assigned to one of the winding devices is then filtered or determined, i.e., filtered or determined as a function of a result of the analysis. Consequently, the filtered partial spectrum is transformed from the frequency domain into the time domain to provide at least part of the time-dependent compensation signal for the drive assigned to the causative winding device.

The compensation signal provided is thus respectively specific to the causative winding device and is used, for example, for the feedforward control of the drive of the causative winding device.

In accordance with a still further embodiment, in step a) the interference variable is acquired as a time-discrete signal in the time domain during a measurement run, in particular before normal operation of the winding machine. The time-discrete signal, as a representation of the acquired interference variable, is then transformed into the frequency domain in step b), for example by means of an FFT.

In accordance with a further embodiment, in step b) the acquired interference variable is transformed from the time domain into the spectrum in the frequency domain by means of a frequency transformation, in particular via a Fourier transformation. Examples of the Fourier transformation comprise FFT (fast Fourier transformation) and DFT (discrete Fourier transformation).

In accordance with a further embodiment, a fast Fourier transformation (FFT) is used as a Fourier transformation. In step a) the interference variable is sampled at a first sampling rate to provide a time-discrete signal. The sampled signal is interpolated via an interpolation, such as via C-splines, and the interpolated signal is sampled at a second sampling rate, such that the number of sampling points corresponds to a power of two. In step b), the signal sampled at the second sampling rate is then transformed into the frequency domain via the FFT. The first sampling rate can in particular also be designated as a real sampling rate of the control device or the controller. The second sampling rate can in particular also be designated as a manipulated sampling rate of the cam dis As a result of using the C-splines and the renewed sampling by means of the second sampling rate, it is not necessary in the present case to fill the initially sampled signal by means of zeros (zero-padding).

In accordance with a further embodiment, feedforward control of the drive is performed via the position-dependent compensation signal.

In accordance with yet a further embodiment, the time-dependent compensation signal is transformed into the position-dependent compensation signal as a function of a respective position of the winding body for a winding cycle from N revolutions of the winding body and is stored in a table of a memory unit. In particular, the respective position of the winding body for a winding cycle from N revolutions of the winding body is determined as a function of the winding length of the coilware and of the rotational speed of the winding body.

In accordance with a still further embodiment, a polynomial table is used as a table for storing the position-dependent compensation signal. The polynomial table can also be designated as a cam disk.

In accordance with yet a further embodiment, for each of the drives of the winding devices, a respective position-dependent compensation signal is provided via a respective execution of steps a) to e). Therefore, for the respective drive of each of the winding devices, a specific position-dependent compensation signal is provided, such that the defects can be compensated in an optimal way and in particular at the correct points of the winding machine. In particular, as driven winding devices besides the supply roll and the winding body, the winding machine has a dancer roll and a feed, which is arranged between the supply roll and the dancer roll. Here, the dancer roll acts as an adjustment unit or as part of an adjustment unit. Additionally or alternatively, the adjustment unit can have a coilware accumulator. Here, the coilware is led over a deflection roll, where the deflection roll is coupled to a servo motor and the winding tension is adjusted with an adjustment of the rotational speed.

A coilware accumulator has a multiplicity of deflection rolls, where the coilware is kept by the multiplicity of deflection rolls on a path that is variable in length. By changing the position of at least one of the deflection rolls, an adjustment of the length of the path is possible. The length of the path of the coilware corresponds to the capacity of the coilware accumulator. The change in the position of the respective deflection roll is in particular made via an actuator. A coilware accumulator can be combined with a dancer roll to equalize fluctuations of the winding tension.

It is also an object of the invention to provide to a second aspect, a computer program product, e.g., a non-transitory computer-readable medium which, on a program-controlled device, causes the execution of the disclosed embodiments of the method for winding coilware from a supply roll onto a winding body.

A computer program product, such as a computer program means, can be provided or supplied, for example, as a storage medium, such as a memory card, USB stick, CD-ROM, DVD, or else in the form of a downloadable file from a server in a network. This can be achieved, for example, in a wire-free communications network, by the transmission of a corresponding file having the computer program product or the computer program means.

It is also an object of the invention to provide a control device for a winding machine, where the control device is configured to execute the disclosed embodiments of the method for winding coilware from a supply roll onto a winding body with the aid of drives.

The control device can be implemented in hardware and/or in software. In a hardware implementation, the control device can be configured as a device, as part of a device, such as a computer or as a microprocessor, or as a control computer. In a software implementation, the control device can be configured as a computer program product, as a function, as a routine, as part of a program code or as an executable object.

The control device is configured to adjust at least one of the drives as a function of a position-dependent compensation signal at least partly compensating a defect when winding the coilware provided from the supply roll onto the winding body over at least one deflection roll. In order to provide the position-dependent compensation signal for the respective drive, the control device includes a first unit for acquiring an interference variable representing the defect in the time domain during a winding operation, a second unit for transforming the acquired interference variable from the time domain into a spectrum in the frequency domain, a third unit for filtering the spectrum via a filter that is specific to the winding device assigned to the drive, a fourth unit for transforming the filtered spectrum from the frequency domain into the time domain to provide a time-dependent compensation signal, and a fifth unit for transforming the time-dependent compensation signal into the position-dependent compensation signal.

Each respective unit can be implemented in hardware and/or in software. In a hardware implementation, the respective unit can be formed as a device or as part of a device, such as a computer or as a microprocessor, or as a control computer. In a software implementation, the respective unit can be configured as a computer program product, as a function, as a routine, as part of a program code or as an executable object.

It is also an object of the invention to provide a winding machine for winding coilware. The winding machine has a plurality of winding devices that can be driven by a plurality of drives and that comprise at least one supply roll for providing the coilware and a winding body, and a control device in accordance with the invention.

The embodiments and features described for the proposed method apply in a corresponding way to the proposed control device and to the proposed winding machine.

Further possible implementations of the invention also comprise combinations, not explicitly named, of features or embodiments described previously or in the following with respect to the exemplary embodiments. Those skilled in the art will also add individual aspects as improvements or extensions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous refinements and aspects of the invention are the subject matter of the subordinate claims and the exemplary embodiments of the invention that are described below. In the further text, the invention will be explained in more detail by using preferred exemplary embodiments with reference to the appended figures, in which:

DETAILED DESCRIPTION OF THE EXEMPLARY EMBODIMENTS

In the figures, identical or functionally identical elements are provided with the same designations if not otherwise specified.

Figure 1:
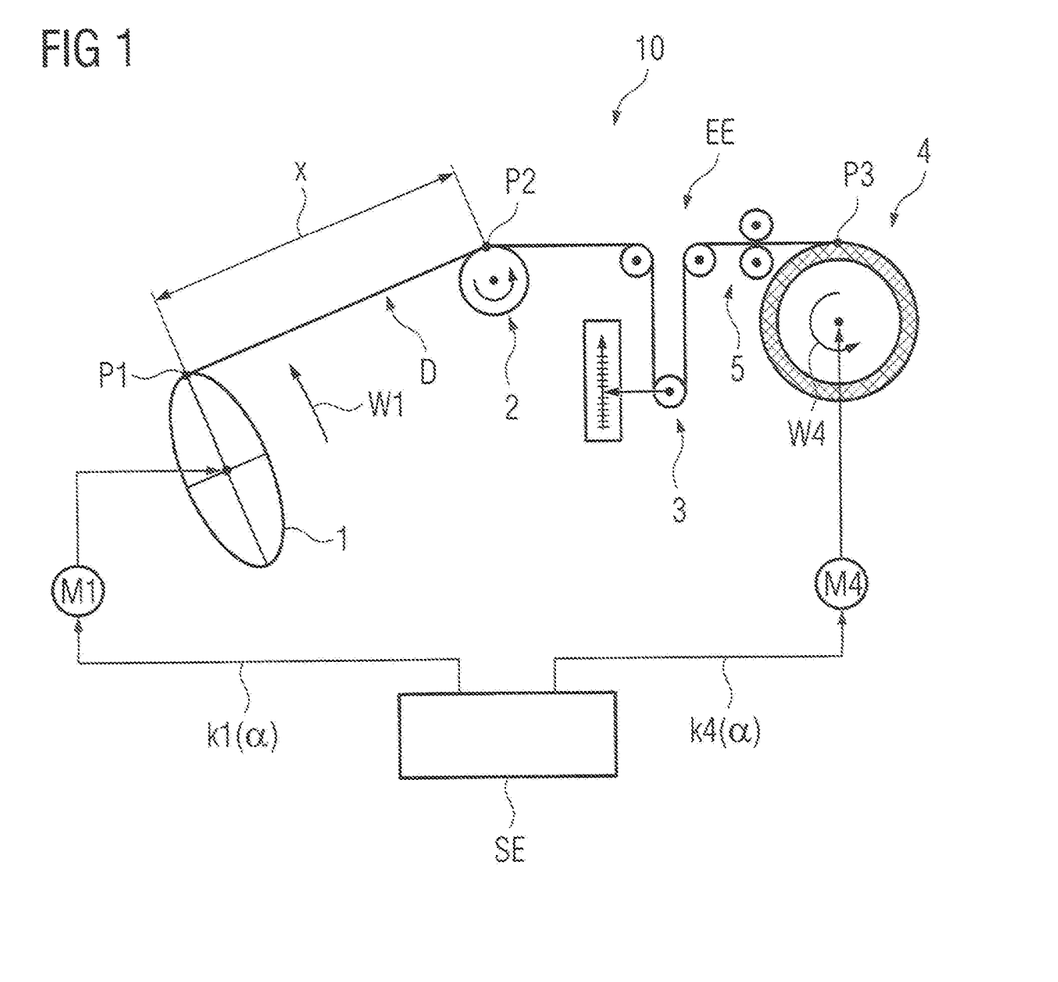
FIG. 1 shows a schematic view of an exemplary embodiment of a winding machine.

A schematic view of an exemplary embodiment of a winding machine 10 is illustrated in FIG. 1.

Figure 2:
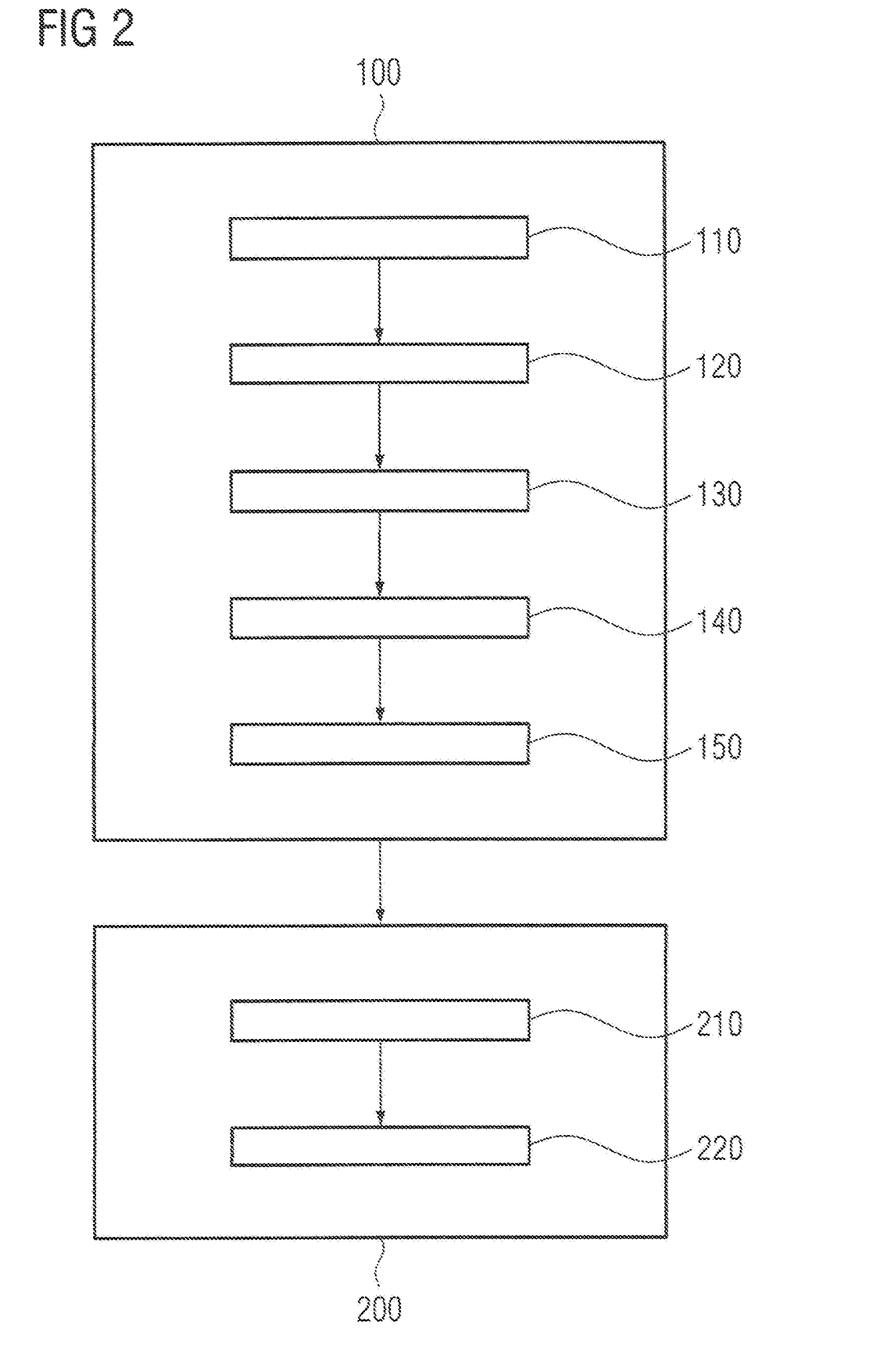
FIG. 2 shows a schematic flow chart of an exemplary embodiment of a method of winding coilware from a supply roll onto a winding body.

Furthermore, FIG. 2 shows a schematic flow chart of an exemplary embodiment of a method of winding coilware D from a supply roll 4 of the winding machine 10 onto a winding body 1 having a non-circular cross section. FIGS. 1 and 2 will be explained below with reference to each other.

The winding machine 10 of FIG. 1 comprises a winding body 1, a deflection roll 2, a dancer roll 3, a supply roll 4 and a feed 5. Here, the dancer roll 3 serves as an adjustment unit EE. Additionally or alternatively, the adjustment unit EE can have a coilware brake or a coilware accumulator. The feed 5 is arranged between the supply roll 4 and the dancer roll 3 and supplies the dancer roll 3 with the coilware D.

The winding body 1 and the supply roll 4 can be driven via drives M1, M4. The drive M1 is assigned to the winding body 1, and the drive M4 is assigned to the supply roll 4. The winding body 1 and the supply roll 4 are therefore examples of winding devices of the winding machine 10 which can be driven by drives M1, M4. The feed 5 can also be assigned a drive (not shown).

The drives M1, M4 can be controlled or regulated via a control device SE. In particular, the control device SE controls or regulates the drives M1, M4 or motors of the winding body 1 and/or the supply roll 4. The winding body 1 rotates at a first rotational speed W1 during the winding operation. The supply roll 4 rotates at a second rotational speed W4. The coilware D is wound around the winding body 1. The coilware D moves through the winding machine 10 at a specific speed. During the winding operation, the coilware D has a specific winding tension. The specific winding tension is adjusted to a target winding tension or envisaged winding tension with the aid of the drive M1 of the winding body 1 and with the aid of the drive M4 for the supply roll 4.

The coilware D is led from the supply roll 4 to the winding body 1 over a deflection roll 2. Here, the coilware D from the deflection roll 2 is wound onto the winding body 1. In FIG. 1, here P1 designates the contact point of the coilware D on the winding body 1, P2 the contact point of the coilware D on the deflection roll 2, and P3 the contact point of the coilware D on the supply roll 4. The coilware D leaves the deflection roll 2 at the contact point P2. The coilware D touches the winding body 1 at the contact point P1. The free length x extends between the contact point P1 and the contact point P2. The free length x corresponds to the length of the coilware D between the deflection roll 2 and the winding body 1. The free length x changes periodically during the winding operation. Furthermore, the contact point P2 on the deflection roll 2 likewise changes periodically.

Now, in the following, in relation to the method according to FIG. 2, the block 100 in FIG. 2 designates a measurement run for generating the position-dependent compensation signals k1(α), k4(α), and block 200 designates an operation (normal operation) of the winding machine 10. Further details relating to the block 100 are explained with reference to FIG. 3, which describes details with regard to the generation of the position-dependent compensation signal k1(α) for the drive M1 of the winding body 1 and of the position-dependent compensation signal k4(α) for the drive M4 of the supply roll 4.

The example of the method of FIG. 2 comprises the measurement run 100 having the steps 110 to 150 and the normal operation 200 having the steps 210 and 220. According to the block 100, the position-dependent compensation signal k1(α), k4(α) for the respective drive M1, M4 is provided by the following steps 110 to 150.

In step 110, an interference variable SG representing the defect during winding is acquired, in particular sampled as a time-discrete signal, in the time domain during a measurement run, in particular before a normal operation 200 of the winding machine 10.

In step 120, the acquired interference variable SG is transformed from the time domain into a spectrum S in the frequency domain. Here, in particular a Fourier transformation, for example, a fast Fourier transformation (FFT) is used.

In particular in step 110, the interference variable SG is sampled via a first sampling rate to provide a time-discrete signal. The sampled signal is then interpolated via C-splines and the interpolated signal is sampled at a second sampling rate, such that the number of sample points corresponds to a power of two. In step 120, the signal sampled at the second sample rate is then transformed into the frequency domain via the FFT.

In step 130, the spectrum S is filtered via a filter F1, F4 that is specific to the winding device 1, 4 assigned to the drive M1, M4. In the present example, the winding body 1, as a winding device, is assigned the drive M1. The drive M1 is in turn assigned a specific filter F1 (see FIG. 3).

Correspondingly, the drive M4 for the supply roll 4, as a winding device, is assigned the drive M4. Correspondingly, the drive M4 is assigned to the filter F4 (see FIG. 3).

In step 140, the filtered spectrum (see TS1, TS4 in FIG. 3) is transformed from the frequency domain into the time domain to provide a time-dependent compensation signal k1(t), k4(t). For this purpose, an inverse transformation relative to that in step 120 is used. For example, if an FFT has been used in step 120, an inverse FFT is used in step 140.

In step 150, the time-dependent compensation signal k1(t), k4(t) is transformed into the position-dependent compensation signal k1(α), k4(α). The feedforward control of the respective drive M1, M4 can be then be implemented via the respective position-dependent compensation signal k1(α), k4(α). In the example of FIG. 1, a position-dependent compensation signal k1(α) is generated for the drive M1 of the winding body 1, and a further position-dependent compensation signal k4(α) is generated for the drive M4 of the supply roll 4. In addition, it is possible to generate a further position-dependent compensation signal (not shown) for the adjustment unit EE of the dancer roll 3 if the dancer roll 3 is assigned a drive.

As explained above, FIG. 3 shows a detailed schematic flow chart of an exemplary embodiment of a method of generating a position-dependent compensation signal k1(α) for the drive M1 of the winding body 1 and a position-dependent compensation signal k4(α) for the supply roll 4.

Figure 3:
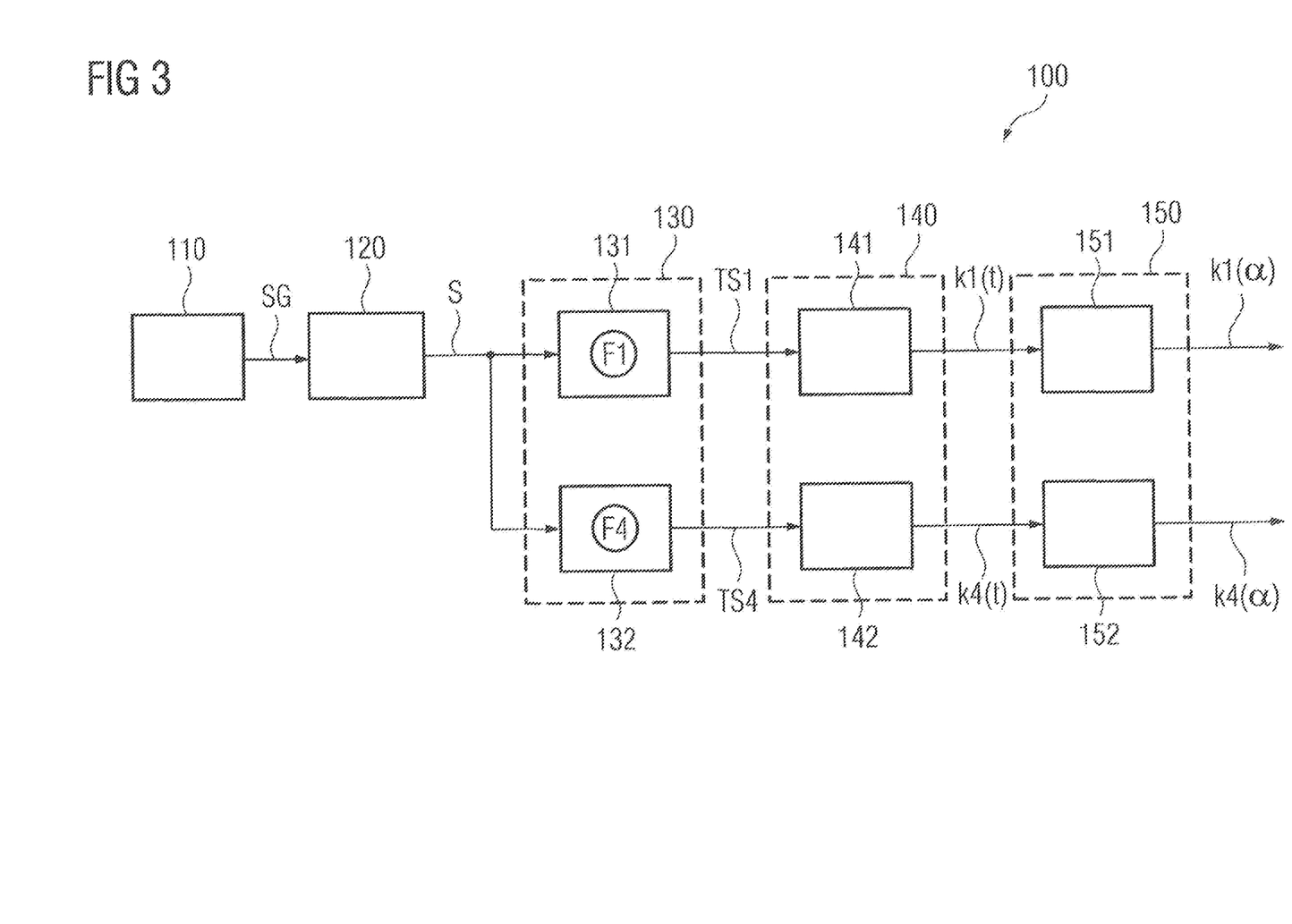
FIG. 3 shows a schematic block diagram of an exemplary embodiment of a method of providing position-dependent compensation signals for drives of two winding devices of the winding machine according to FIG. 1.

The steps 110 to 150 of the block 100 of FIG. 3 are based on the steps 110 to 150 of the block 100 of FIG. 2, where steps 130 to 150 for the two drives M1, M4 and for the generation of the two position-dependent compensation signals k1(α) and k4(α) differ.

With references to FIG. 3 for this purpose, in detail in relation to steps 110 to 150, in step 110, the interference variable SG representing the defect is acquired in the time domain during a winding operation.

In step 120, the interference variable SG is transformed into a spectrum S in the frequency domain.

In the following, in the steps 130 to 150, there is a respective path for the respective drive M1, M4. The path for the drive M1 and therefore for the corresponding position-dependent compensation signal k1(α) comprises the steps 131, 141 and 151. The path for the drive M4 and the corresponding position-dependent compensation signal k4(α) comprises the steps 132, 142 and 152.

In step 131, those partial spectra TS1 of the spectrum S that correspond to an operating frequency of the winding body 1 assigned to the drive M1 or one or more of its harmonics are filtered out. In the following step 141, the partial spectrum TS1 that is filtered out is transformed from the frequency domain into the time domain to provide a time-dependent compensation signal k1(t) for the drive M1. In step 151, the time-dependent compensation signal k1(t) is then transformed into the position-dependent compensation signal k1(α) for the drive M1.

Analogously, the position-dependent compensation signal k4(α) for the drive M4 of the supply roll 4 is generated. In step 132, those partial spectra TS4 of the spectrum S that correspond to an operating frequency of the supply roll 4 assigned to the drive M4 or one of its harmonics are filtered out. In subsequent step 142, the filtered out partial spectrum TS4 is transformed from the frequency domain into the time domain to provide a time-dependent compensation signal k4(t) for the drive M4. In step 152, the time-dependent compensation signal k4(t) is then transformed into the position-dependent compensation signal k4(α) for the drive M4.

Overall, the filter F1 is specific to the drive M1, and the filter F4 is specific to the drive M4. Correspondingly, the filter F1 is configured as a function of parameters of the winding body 1, in particular its rotational speed W1. Correspondingly, the filter F4 is configured as a function of parameters of the supply roll 4 assigned to the drive M4, in particular its rotational speed W4 during the operation of the winding machine 10.

Figure 4:
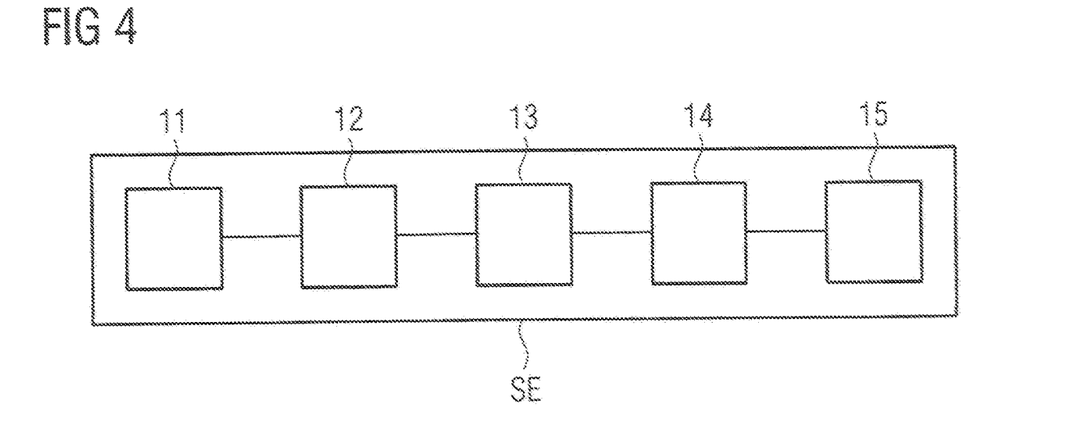
FIG. 4 shows a schematic block diagram of an exemplary embodiment of a control device for a winding machine.

Furthermore, FIG. 4 shows a schematic block diagram of an exemplary embodiment of a control device SE (see also FIG. 1) for a winding machine 10. The control device SE comprises a first unit 11, a second unit 12, a third unit 13, a fourth unit 14 and a fifth unit 15 for providing the position-dependent compensation signal k1(α), k4(α) for the respective drive M1, M4.

The first unit 11 is configured to acquire an interference variable SG representing the defect in the time domain during a winding operation.

The second unit 12 is configured to transform the acquired interference variable SG from the time domain into a spectrum S in the frequency domain.

The third unit 13 is configured to filter the spectrum S via a filter F1, F4 that is specific to the winding device 1, 4 assigned to the drive M1, M4.

The fourth unit 14 is configured to transform the filtered spectrum TS1, TS4 from the frequency domain into the time domain to provide a time-dependent compensation signal k1($t$), k4($t$).

The fifth unit 15 is configured to transform the time-dependent compensation signal k1($t$), k4($t$) into the position-dependent compensation signal k1($\alpha$), k4($\alpha$).

Furthermore, the control device SE is configured to adjust, for example, to perform feedforward control or to regulate, at least one of the drives M1, M4 (both drives M1 and M4 in the example of FIG. 1) as a function of the position-dependent compensation signals k1($\alpha$), k4($\alpha$) during the winding of the coilware D provided from the supply roll 4.

Although the present invention has been described by using exemplary embodiments, it can be modified in multifarious ways.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of winding coilware via a winding machine having a plurality of winding devices which are drivable by a respectively assigned drive, and which comprise at least a supply roll and a winding body, the method comprising:
   providing the coilware from the supply roll; and
   winding the coilware provided from the supply roll over at least one deflection roll onto the winding body, at least one of the drives being adjusted as a function of a position-dependent compensation signal at least partly compensating a defect, and the position-dependent compensation signal for the respective drive being provided by:
   a) acquiring an interference variable representing a defect in the time domain during a winding operation;
   b) transforming the acquired interference variable from the time domain into a spectrum in the frequency domain;
   c) filtering the spectrum via a filter specific to a winding device of the plurality of winding devices respectively assigned to the drive;
   d) transforming the filtered spectrum from the frequency domain into the time domain to provide a time-dependent compensation signal, and
   e) transforming the time-dependent compensation signal into the position-dependent compensation signal.

2. The method as claimed in claim 1, wherein the filter respectively assigned to the drive is configured as a function of parameters of the winding device of the plurality of winding devices respectively assigned to the drive.

3. The method as claimed in claim 2, wherein during the filtering of the spectrum in step c), those partial spectra of the spectrum which depend on an operating frequency of the winding device of the plurality of winding devices respectively assigned to the drive are filtered out; and
   wherein, in step d), the filtered out partial spectra are transformed from the frequency domain into the time domain to provide the time-dependent compensation signal for the drive.

4. The method as claimed in claim 2, wherein during the filtering of the spectrum in step c), those partial spectra of the spectrum which correspond to an operating frequency of the winding device of the plurality of winding devices respectively assigned to the drive or one harmonic of the spectrum (s) are filtered out; and
   wherein, in step d), the filtered out partial spectra which are transformed from the frequency domain into the time domain to provide the time-dependent compensation signal for the drive.

5. The method as claimed in claim 1, wherein during the filtering of the spectrum in step c), frequencies of the spectrum above a specific limiting frequency are masked out.

6. The method as claimed in claim 5, wherein during the filtering of the spectrum in step c), those partial spectra of the spectrum which depend on an operating frequency of the winding device of the plurality of winding devices respectively assigned to the drive are filtered out; and
   wherein, in step d), the filtered out partial spectra are transformed from the frequency domain into the time domain to provide the time-dependent compensation signal for the drive.

7. The method as claimed in claim 5, wherein during the filtering of the spectrum in step c), those partial spectra of the spectrum which correspond to an operating frequency of the winding device of the plurality of winding devices respectively assigned to the drive or one harmonic of the spectrum are filtered out; and
   wherein, in step d), the filtered out partial spectra which are transformed from the frequency domain into the time domain to provide the time-dependent compensation signal for the drive.

8. The method as claimed in claim 1, wherein during the filtering of the spectrum in step c), those partial spectra of the spectrum which depend on an operating frequency of the winding device of the plurality of winding devices respectively assigned to the drive are filtered out; and
   wherein, in step d), the filtered out partial spectra are transformed from the frequency domain into the time domain to provide the time-dependent compensation signal for the drive.

9. The method as claimed in claim 1, wherein during the filtering of the spectrum in step c), those partial spectra of the spectrum which correspond to an operating frequency of the winding device of the plurality of winding devices respectively assigned to the drive or one harmonic of the spectrum are filtered out; and
   wherein, in step d), the filtered out partial spectra which are transformed from the frequency domain into the time domain to provide the time-dependent compensation signal for the drive.

10. The method as claimed in claim 1, wherein subsequent to step b), the spectrum is analyzed to assign at least one partial spectrum to a winding device of the plurality of winding device at least partly causing the defect;
- wherein the respective partial spectrum assigned to one winding devices of the plurality of winding devices is filtered; and
- wherein the filtered partial spectrum is transformed from the frequency domain into the time domain to provide at least part of the time-dependant compensation signal for the drive assigned to the causative winding device.

11. The method as claimed in claim 10, wherein the respective partial spectrum assigned to one winding devices of the plurality of winding devices is filtered as a function of a result of the analysis.

12. The method as claimed in claim 1, wherein during step a), the interference variable is acquired as a time-discrete signal in the time domain during a measurement run before normal operation of the winding machine.

13. The method as claimed in claim 1, wherein during step b), the acquired interference variable is transformed from the time domain into the spectrum in the frequency domain via a frequency transformation.

14. The method as claimed in claim 13, wherein the frequency transformation comprises a Fourier transformation.

15. The method as claimed in claim 13, wherein a fast Fourier transformation (FFT) is utilized as the frequency transformation;
- wherein in step a) the acquired interference variable is sampled at a first sampling rate to provide a time-discrete signal;
- wherein the sampled signal is interpolated via C-splines, and the interpolated signal is sampled at a second sampling rate, such that a number of sampling points corresponds to a power of two.

16. The method as claimed in claim 1, wherein feedforward control of the drive is performed via the position-dependent compensation signal.

17. The method as claimed in claim 1, wherein the time-dependent compensation signal is transformed into the position-dependent compensation signal as a function of a respective position of the winding body for a winding cycle from N revolutions of the winding body, and is stored in a table of a memory unit.

18. The method as claimed in claim 1, wherein for each of respective drive respectively assigned to the plurality of winding devices, a respective position-dependent compensation signal is provided via a respective execution of steps a) to e).

19. A non-transitory computer readable-medium computer program encoded with a computer program which, when executed on a program-controlled device, causes winding of coilware via a winding machine having a plurality of winding devices which are drivable by a respectively assigned drive, and which comprise at least a supply roll and a winding body, the computer program comprising:
- program code for providing the coilware from the supply roll; and
- program code for winding the coilware provided from the supply roll over at least one deflection roll onto the winding body, at least one of the drives being adjusted as a function of a position-dependent compensation signal at least partly compensating a defect, and the position-dependent compensation signal for the respective drive being provided by:
  a) acquiring an interference variable representing a defect in the time domain during a winding operation;
  b) transforming the acquired interference variable from the time domain into a spectrum in the frequency domain;
  c) filtering the spectrum via a filter specific to a winding device of the plurality of winding devices respectively assigned to the drive;
  d) transforming the filtered spectrum from the frequency domain into the time domain to provide a time-dependent compensation signal, and
  e) transforming the time-dependent compensation signal into the position-dependent compensation signal.

20. A controller for a winding machine, the control device being configured, aided by drives, to:
- provide coilware from a supply roll; and
- wind the coilware provided from the supply roll over at least one deflection roll onto a winding body, at least one drive of the drives being adjusted as a function of a position-dependent compensation signal at least partly compensating a defect, and the position-dependent compensation signal for the respective drive being provided by:
  a) acquiring an interference variable representing a defect in the time domain during a winding operation;
  b) transforming the acquired interference variable from the time domain into a spectrum in the frequency domain;
  c) filtering the spectrum via a filter specific to a winding device of a plurality of winding devices respectively assigned to the drives;
  d) transforming the filtered spectrum from the frequency domain into the time domain to provide a time-dependent compensation signal, and
  e) transforming the time-dependent compensation signal into the position-dependent compensation signal.

21. A winding machine for winding coilware, having a plurality of winding devices which are drivable by a respectively assigned drive and which comprise at least one supply roll for providing the coilware and a winding body, the winding machine comprising:
- a controller which is configured to adjust at least one drive of the drives as a function of a position-dependent compensation signal at least partly compensating a defect when winding the coilware provided from the at least one supply roll onto the winding body over at least one deflection roll, the control device for providing the position-dependent compensation signal for a respective drive including:
  a first unit for acquiring an interference variable representing the defect in the time domain during a winding operation;
  a second unit for transforming the acquired interference variable from the time domain into a spectrum in the frequency domain;
  a third unit for filtering the spectrum via a filter which is specific to a winding device of the plurality of winding devices respectively assigned to the drive,
  a fourth unit for transforming the filtered spectrum from the frequency domain into the time domain to provide a time-dependent compensation signal; and
  a fifth unit for transforming the time-depending compensation signal into the position-dependent compensation signal.

* * * * *